(12) United States Patent
Matteucci et al.

(10) Patent No.: US 6,824,889 B2
(45) Date of Patent: Nov. 30, 2004

(54) PLATABLE ENGINEERED POLYOLEFIN ALLOYS AND ARTICLES CONTAINING SAME

(75) Inventors: Scott Matteucci, Arlington, TX (US); Satchit Srinivasan, Carrollton, TX (US); Ruidong Ding, Arlington, TX (US)

(73) Assignee: Solvay Engineered Polymers, Inc., Grand Prairie, TX (US)

( * ) Notice: Subject to any disclaimer, the term of this patent is extended or adjusted under 35 U.S.C. 154(b) by 77 days.

(21) Appl. No.: 10/187,911

(22) Filed: Jul. 3, 2002

(65) Prior Publication Data

US 2004/0005473 A1 Jan. 8, 2004

(51) Int. Cl.$^7$ .......................... B32B 15/06; C25D 5/56; C08F 8/00
(52) U.S. Cl. ...................... 428/626; 428/457; 428/461; 428/935; 525/191; 525/240; 525/241; 525/331.9; 205/165; 205/927; 205/928
(58) Field of Search ................. 428/626, 457, 428/461, 935; 525/191, 240, 241, 331.7, 331.9; 205/165, 927, 928

(56) References Cited

U.S. PATENT DOCUMENTS

| | | | |
|---|---|---|---|
| 3,466,232 A | 9/1969 | Francis et al. ............. 204/30 |
| 3,655,433 A | 4/1972 | Poppe et al. .......... 117/138.8 E |
| 3,663,260 A | 5/1972 | Poppe et al. ............. 117/47 A |
| 3,918,927 A | 11/1975 | Wells ........................ 29/195 |
| 3,926,932 A | 12/1975 | Abu-Isa ................... 260/93.7 |
| 3,929,702 A | 12/1975 | Miller et al. ............. 260/27 R |
| 4,038,042 A | 7/1977 | Adelman ................... 428/625 |
| 4,111,898 A | 9/1978 | Inayoshi et al. ......... 260/42.53 |
| 4,199,491 A | * 4/1980 | Inayoshi et al. ............ 524/377 |
| 4,772,496 A | 9/1988 | Maeda et al. ................ 428/35 |
| 4,945,005 A | 7/1990 | Aleckner, Jr. et al. ....... 428/500 |
| 4,946,896 A | 8/1990 | Mitsuno et al. ............... 525/93 |
| 4,950,541 A | 8/1990 | Tabor et al. ................ 428/373 |
| 5,140,070 A | 8/1992 | MacLeay et al. ........... 525/169 |
| 5,883,188 A | 3/1999 | Hwang et al. ................ 525/71 |
| 5,959,042 A | 9/1999 | Bouilloux et al. .......... 525/420 |
| 6,027,817 A | 2/2000 | Otsuki et al. ............... 428/461 |
| 6,261,697 B1 | * 7/2001 | Otsuki et al. ............... 428/461 |
| 6,413,652 B1 | * 7/2002 | Ding et al. ................. 428/626 |
| 6,509,107 B2 | * 1/2003 | Ding et al. ................. 428/626 |
| 2002/0132108 A1 | * 9/2002 | Ikegawa et al. ............. 428/323 |

FOREIGN PATENT DOCUMENTS

| | | | |
|---|---|---|---|
| EP | 0 794 225 | | 9/1977 |
| JP | 02173052 A | * | 4/1990 |
| JP | 06049304 A | * | 2/1994 |
| JP | 10-219040 | | 8/1998 |
| WO | WO97/38050 | | 10/1977 |

OTHER PUBLICATIONS

James M. Margolis, "Plating On Plastics," A Technical Economic and Marketing Report (1984), pp. 35–59.

* cited by examiner

*Primary Examiner*—Monique R. Jackson
(74) *Attorney, Agent, or Firm*—Winston & Strawn LLP

(57) ABSTRACT

This invention relates to polyolefin alloys that are receptive to metal plating. These compositions also have enhanced properties and are easily processed into articles by various molding methods. The blends of the invention preferably include a polyethylene component, acrylonitrile-butadiene-styrene polymer(s), and at least one styrene monoolefin copolymer. The invention also relates to articles containing such alloys, and to methods of forming such blends and articles containing the same. These blends have excellent platability and superior physical properties including enhanced stiffness and toughness.

22 Claims, No Drawings

PLATABLE ENGINEERED POLYOLEFIN ALLOYS AND ARTICLES CONTAINING SAME

FIELD OF INVENTION

The present invention relates to polyolefin alloys that are specially formulated to be readily plated with various metals. These compositions can be easily processed into molded articles by molding methods, such as injection, and then plated with metal, such as to provide a decorative or functional finish. More particularly, these compositions are blends of an ethylene component, acrylonitrile-butadiene-styrene polymer component, and styrene monoolefin copolymer component, which blends have excellent platability as well as preferably having superior physical properties including enhanced stiffness and toughness.

BACKGROUND ART

A substantial market exists for metal plated thermoplastics, particularly for applications in the automotive industry. The current overwhelming choice of plastic materials for such applications include acrylonitrile-butadiene-styrene (ABS) engineered resins, either alone or in polymer alloys with polycarbonates. These materials are useful due to the degree of unsaturation and polarity of the plastic, which render it suitable for metal plating.

There are disadvantages in the use of ABS resins. The platable grades are relatively expensive, while the final properties of the metal plated plastic are not all that are desired. In an effort to improve upon the properties of the plastic, polyolefin blends have been utilized as alternatives. These blends include thermoplastic polyolefins and are widely used in interior and exterior automotive applications, such as bumpers, body panels, fascia, and the like. Many of these are decorated by full or partial painting for enhanced visual or functional effects.

Polyolefins, however, are difficult to plate with metal, due to a lack of polarity or unsaturation. While it can be plated using special electroplating conditions, it generally is not because of cost and availability considerations. Since polyolefins, such as polyethylene homopolymers or copolymers, have certain performance advantages compared to ABS, the modification of this material to improve platability has been studied.

U.S. Pat. No. 3,655,433 discloses polyolefin alloys that are suitable for electroplating, wherein the adhesion of metal to the compositions is enhanced by incorporating into the composition a metal resinate. Crystalline polyolefins are modified with metal resins to improve the adhesion of metal thereto.

U.S. Pat. No. 3,663,260 discloses a metallizable polyolefin superimposed on a metal layer, wherein the polyolefin contains a finely divided talc having a platey (minacious) or massive (granular) particle shape. The talc filled polyolefin composition may be metallized by electroplating or other metallizing processes to form metallized shaped articles.

U.S. Pat. No. 4,038,042 discloses polyolefin-based compositions that are blends of particular proportions and types of polyethylene, low polarity rubber, highly conductive carbon black, polypropylene and optional mineral additives that provide electroplating to give adherent, plated surfaces.

U.S. Pat. No. 4,199,491 discloses polyolefin resin compositions including block copolymers of polypropylene and polyethylene. In particular, improved plating by the high-chrome etching-catalyst method can be accomplished by blending a compound containing a cyano group with a mixture of polyolefin resin and inorganic filler. Unsaturated carboxylic acids or rubbers are also blended therein.

U.S. Pat. No. 6,027,817 discloses a resin composition based on a styrenic polymer having a syndiotactic configuration, which resin also contains elastomers, thermoplastic resins and fillers that are soluble in oxidizing agents. Glass fibers and fumaric-acid-modified polyphenylene ether may also be blended therein.

Despite these patents, there still exists a need for olefinic materials containing ethylene homopolymers or copolymers that are readily electroplatable utilizing conventional processes to obtain parts or components that are visually appealing as well as functional. The present invention satisfies this need.

SUMMARY OF THE INVENTION

The invention encompasses platable polyolefin blends including an ethylene component that includes polyethylene, high density polyethylene, low density polyethylene, linear low density polyethylene, or a combination thereof, a polymeric compatibilizer including at least one styrene monoolefin copolymer (e.g., a hydrogenated styrenic copolymer) present in an amount sufficient to facilitate adhesion between the components of the polyolefin blend, and an ABS resin component of an acrylonitrile-butadiene-styrene resin or a blend of styrene-acrylonitrile resin with a diene, the ABS resin component being present in an amount sufficient to render the polyolefin blend suitable for electroplating. In one embodiment, the ethylene component includes an ethylene homopolymer, while in another embodiment the ethylene component includes an ethylene copolymer.

The invention also relates to platable polyolefin blends including an ethylene component, a polymeric compatibilizer that includes at least one styrene monoolefin (e.g., a hydrogenated styrenic copolymer), wherein the styrenic copolymers is present in an amount sufficient to facilitate adhesion between the components of the polyolefin blend, and an ABS resin component of an acrylonitrile-butadiene-styrene resin or a blend of styrene-acrylonitrile resin with a diene. Suitable ethylene components include one or more polyethylenes, high density polyethylenes, low density polyethylenes, or a combination thereof The ABS resin component is present in an amount sufficient to render the polyolefin blend suitable for electroplating.

In one embodiment, the at least one styrene monoolefin copolymer includes at least one hydrogenated styrenic copolymer. Advantageously, the styrene monoolefin copolymer includes one or more random or block copolymers of styrene and a hydrogenated olefinic component; random copolymers of ethylene and styrene; or combinations thereof. The styrene monoolefin copolymers preferably include styrene-ethylene/butylene-styrene (SEBS), styrene-ethylene/butylene, styrene-butylene-butadiene-styrene (SBBS), styrene-ethylene/propylene-styrene, styrene/ethylene-propylene, styrene-ethylene/propylene-styrene-ethylene-propylene, or combinations thereof, and is present in an amount of about 1 to 45 weight percent of the polyolefin blend. In a preferred embodiment, the polymeric compatiblizer includes about 2 to 40 weight percent of a styrene monoolefin copolymer.

The polymeric compatibilizer may optionally include a styrene diolefin copolymer (e.g., a non-hydrogenated styrenic copolymer), which includes block or random copolymers of styrene and an unsaturated olefinic component. Preferably, this copolymer comprises styrene-butadiene (SB), styrene-butadiene-styrene, styrene-isoprene, styrene-isoprene-styrene, or mixtures thereof.

Advantageously, the compatibilizer can be a block or random copolymer including at least two different block copolymers of styrene-ethylene/butylene-styrene, styrene-ethylene/propylene-styrene, styrene-ethylene/butylene, styrene/ethylene-propylene, styrene-butadiene-styrene, styrene-butylene-butadiene-styrene, styrene/butadiene, styrene-ethylene/propylene-styrene-ethylene/propylene, styrene-isoprene, styrene-isoprene-styrene, or mixtures thereof, so long as at least one of the polymers is hydrogenated. Additionally, the compatibilizer can comprise copolymers of ethylene and styrene, or random copolymers of styrene, ethylene, butylene, propylene, or mixtures thereof.

The platable polyolefin blend optionally but preferably includes a toughening agent of a substantially amorphous copolymer or terpolymer of ethylene and an alpha olefin. In particular, the substantially amorphous copolymer or terpolymer includes but is not limited to ethylene, an alpha olefin, and a diene or mixtures thereof. The platable polyolefin blend optionally includes a propylene-containing polymer formed from a semi-crystalline homopolymer of propylene or a copolymer of propylene with ethylene or an alpha-olefin.

In these blends, the ethylene homopolymer component is typically present in an amount of about 20 to 80 weight percent, the polymeric compatibilizer is present in an amount of about 1 to 45 weight percent, and the ABS resin component is present in an amount of about 2 to 60 weight percent of the alloy. When present, the substantially amorphous copolymer or terpolymer of ethylene and an alpha olefin is used in an amount of about 0.01 to 30 weight percent. The optional propylene-containing polymer formed from a semi-crystalline homopolymer of propylene or a copolymer of propylene with ethylene or an alpha-olefin is used in an amount of up to about 20 weight percent.

Inorganic fillers are optionally included in amounts up to about 35 weight percent. When an inorganic filler is included, it is typically present in an amount of about 0.01 to 35 percent by weight. Preferably, however, the invention includes an inorganic filler present in an amount of about 5 to 20 percent by weight of the polyolefin blend. In another embodiment, the polyolefin blend is substantially free of inorganic filler, or preferably even completely free of inorganic filler, which facilitates downstream processing of the blend. "Substantially free," as used herein, refers to less than about 5 weight percent, preferably less than about 1 weight percent, and more preferably less than about 0.1 weight percent filler in the blend. In one preferred embodiment, the blend is ductile at 0° C.

The invention also relates to a molded article of manufacture including the polyolefin blends described above, as well as molded articles in the form of automotive components. The invention further encompasses molded articles, such as automotive components, that further include a metal deposit disposed over a portion thereof.

The invention also encompasses a platable polyolefin blend including an ethylene component present in an amount of about 20 to 80 weight percent and including polyethylene, high density polyethylene, low density polyethylene, linear low density polyethylene, or a combination thereof, a polymeric compatibilizer comprising at least one styrene monoolefin copolymer present in an amount of about 1 to 45 weight percent to facilitate adhesion between the components of the polyolefin blend, an ABS resin component of an acrylonitrile-butadiene-styrene resin or a blend of styrene-acrylonitrile resin with a diene, the ABS resin component being present in an amount of about 2 to 60 weight percent to render the polyolefin blend suitable for electroplating, and optionally, a toughening agent of a substantially amorphous copolymer or terpolymer of ethylene and an alpha olefin present in an amount of about 0.01 to 30 weight percent.

The invention further encompasses a process for preparing a plated polyolefin article by blending an ethylene component, a polymeric compatibilizer including at least one styrene monoolefin present in an amount sufficient to facilitate adhesion between the components of the polyolefin blend, and an ABS resin component of an acrylonitrile-butadiene-styrene resin or a blend of styrene-acrylonitrile resin with a diene, the ABS resin component being present in an amount sufficient to render the polyolefin blend suitable for electroplating, to form a blend, forming the blend into an article having a desired form, shape, and an exterior surface, depositing an initial conductive metal onto at least a portion of the surface of the article, and plating a second metal over the polyolefin article.

In a preferred embodiment, the polyolefin article is formed by molding the blend. In another preferred embodiment, the second metal is deposited by electroplating or by vacuum deposition. In a particular embodiment, the initial conductive metal is copper, a nickel/phosphorus alloy, or a mixture thereof. In a particular embodiment, the second metal includes at least one of nickel, copper, and chromium, or a mixture thereof.

In a particular embodiment, the plated polyolefin article is prepared in the form of a molded article. In a preferred embodiment, the molded article is an automotive component.

DETAILED DESCRIPTION OF THE INVENTION

It has now been advantageously found that the platability of ethylene homopolymers and copolymers can be improved by the addition of certain ABS resin components and a hydrogenated styrenic compound. The term "ABS resin components" refers to resins of acrylonitrile-butadiene-styrene commonly used in the plastics industry. These combined components can synergistically achieve an unexpectedly improved platable blend, as presently claimed, that is distinguished from lists of materials in the art including thousands of different components.

As used herein, the word "blend" or "blends" includes the mechanical polyblends, mechanochemical polyblends, chemical polyblends, solution cast polyblends and latex polyblends as described in the Kirk-Othmer Concise Encyclopedia of Chemical Technology, Volume 24, 3rd ed. pp. 920–922; Wiley & Sons, New York. The word "blend" also includes physical mixtures of at least two polymeric materials. The polyolefin alloys of the invention include such blends, as discussed herein.

"Ethylene component" is used herein to refer to polymers ethylene-containing homopolymers, ethylene homopolymer component, ethylene-containing copolymers, and ethylene copolymer components. The ethylene component is preferably at least substantially free, or entirely free, of polypropylene or additional carbon subsitutents. Suitable types of ethylene component for use in polymers in an ethylene component according to the invention include one or more polyethylene, high density polyethylene, low density polyethylene, linear low density polyethylene, and combinations thereof. In one embodiment, the ethylene component preferably includes high density polyethylene. In another preferred embodiment, the ethylene component includes linear low density polyethylene, while in another embodiment, the ethylene component includes one or more of polyethylene, high density polyethylene, low density polyethylene, and combinations thereof. Any suitable ethylene component can be used in the invention, for example, the ethylene component can include a high density linear polyethylene homopolymer and a linear low density polyethylene copolymer of ethylene and octene. The ethylene component may be polymerized in any suitable manner, preferably via either Ziegler-Natta type catalysts or metallocene catalysts, or both. When an ethylene copolymer is included in the ethylene component, it will preferably include copolymers of ethylene and at least one monomer chosen from $C_4$ to $C_{20}$ alpha-olefins.

It is preferred that the ethylene component make up about 20 to 80 weight percent of the overall composition, and in one embodiment from greater than 20 to about 80 weight percent. In one preferred embodiment, the ethylene component is present in an amount of about 22 to 75 weight percent, more preferably from about 25 to 70 weight percent of the overall composition. One or more ethylene materials can be included in the ethylene component of the invention, and there can be included more than one of any given type of ethylene component. When multiple ethylene materials are present in the ethylene component, they can be different or the same. Exemplary ethylene components are commercially available as Alathon® from Equistar Chemicals of Houston, Tex., as Marlex® from Chevron Phillips of Houston, Tex., as Fortiflex® from Solvay America of Houston, Tex., and as Escorene® from ExxonMobil of Houston, Tex.

The platable polyolefin composition also includes an ABS material or derivative thereof, which is preferably an acrylonitrile-butadiene-styrene resin. This ABS resin is a polymer typically made by blending acrylonitrile-styrene copolymer with a butadiene rubber or by interpolymerizing polybutadiene with styrene and acrylonitrile. This ABS resin component, when combined with the ethylene component, provides a substantial increase in the platability of the final blend compared to compositions with insufficient ABS resin or those completely lacking ABS resin. It is preferred that this ABS resin component make up about 2 to 60 weight percent of the polyolefin composition, preferably about 3 to 55 weight percent of the polyolefin composition. In one embodiment, the ABS resin is more preferably present in an amount from about 5 to 50 weight percent of the polyolefin composition. One or more ABS materials can be included within the ABS resin component. Exemplary acrylonitrile-butadiene-styrene resins are commercially available as Sinkral® from EniChem Americas Inc. of Houston, Tex., as Lustran® from Bayer Corporation of Pittsburgh, Pa., and as Cycolac® of GE Plastics of Pittsfield, Mass.

Another component in the polyolefin composition of the present invention is a polymeric compatibilizer including styrene. In one embodiment, the blends and articles of the invention include only a single styrene, while in another embodiment, the polymeric compatibilizer includes only styrenes that require temperatures below about 250° F. to process. This compatibilizing component acts as an interfacial modifier to facilitate adhesion of the components in the blend. Preferably, the compatibilizer includes at least one styrenic copolymer. The compatibilizer preferably includes at least one styrenic random or block compound or thermoplastic elastomer that includes styrene. The term "styrenic copolymer" is used to designate a random, block, or grafted compound that includes styrene or a styrene derivative therein. If a styrenic block copolymer is used, the structure of the styrene block copolymer can be of the linear or radial type, and of the diblock or triblock type.

It is advantageous for the polymeric compatibilizer to include at least one styrene monoolefin copolymer which is present in an amount sufficient to facilitate adhesion between the components of the polyolefin blend. In this embodiment, the styrene monoolefin copolymer of the polymeric compatibilizer is preferably present in an amount of about 1 to 45 weight percent, more preferably about 2 to 40 weight percent, and, in one embodiment, even more preferably from about 3 to 35 weight percent of the platable polyolefin blend. In addition to significantly improving adhesion between the polymeric phases, the compatibilizer can help contribute to compatibility with other components in the blend, such as the optional filler. This can improve toughness of the overall composition. In a more preferred embodiment, inclusion of at least one hydrogenated styrenic component can facilitate compatibility between components of the blend.

Styrene monoolefin copolymers preferably include one or more of the following: block or random copolymers of styrene and an hydrogenated olefinic component including ethylene, butylene, or propylene, and combinations thereof; random copolymers of ethylene and styrene; and combinations thereof. Exemplary copolymers include: styrene-ethylene/butylene-styrene (SEBS), styrene-ethylene/butylene, styrene-butylene-butadiene-styrene (SBBS), styrene-ethylene/propylene-styrene, styrene/ethylene-propylene, styrene-ethylene/propylene-styrene-ethylene-propylene, and combinations thereof. Exemplary styrene monoolefin copolymers are commercially available as Dynaflex® from GLS Corporation of McHenry, Ill., as Tuftec® from Asahi America Inc. of Malden, Mass., and as Kraton® from Kraton Polymers of Houston, Tex.

The polymeric compatibilizer may optionally include a styrene diolefin copolymer (e.g., a non-hydrogenated styrenic copolymer), which includes block or random copolymers of styrene and an unsaturated olefinic component. Preferably, this copolymer includes styrene-butadiene (SB), styrene-butadiene-styrene, styrene-isoprene, styrene-isoprene-styrene, or mixtures thereof, and can be present in an amount of up to about 35 weight percent, such as about 0.001 weight percent to 35 weight percent. Exemplary styrene diolefin copolymers are commercially available as Styrolux® from BASF Corporation of Mt. Olive, N.J., as K-Resin® from Chevron Phillips of Houston, Tex., and Europrene® from EniChem Elastomers Americas of Houston, Tex.

The styrenic portion of the compatibilizing copolymer is preferably a polymer of styrene and its analogs and homologs, including alpha methylstyrene, and ring-substituted styrenes, particularly ring-methylated styrenes. The preferred styrenics include styrene and alpha methylstyrene, with styrene being especially preferred. Additionally, the compatibilizer can include a random styrenic copolymer of ethylene and styrene. It is particularly preferred that the random styrenic copolymer of ethylene and styrene have a blocky comonomer distribution. By "blocky comonomer distribution" it is meant that there are more repeating monomer units than would be expected in a random distribution. Such a distribution would be provided by a random distribution of blocks of a plurality of monomer units. This type of polymer can be manufactured by single-site catalysis, e.g., metallocene or single-site non-metallocene catalysis.

An optional but preferred component that is present in the polyolefin composition of the present invention is a toughening agent of one or more substantially amorphous copolymers (including terpolymers) of ethylene and an alpha olefin. This component is present as a toughening component for the blend. A preferred copolymer is a semi-crystalline rubbery copolymer of two or more alpha mono-olefins, such as copolymers of ethylene and propylene. Also suitable are copolymers of semi-crystalline rubbery copolymers of two or more alpha mono-olefins, such as ethylene and propylene, and a lesser quantity of a nonconjugated diene.

Suitable alpha olefins that can be used in the toughening component are illustrated by the formula $CH_2=CHR$, wherein R is hydrogen or an alkyl radical of one to sixteen carbon atoms. Examples of suitable alpha olefins include, but are not limited to ethylene; propylene; 1-butene; 1-pentene; 1-hexene; 2-methyl-1-propene; 3-methyl-1-pentene; 4-methyl-1-pentene; 3,3-dimethyl-1-butene; 2,4,4-trimethyl-1-pentene; 5-methyl-1-hexene; 1-4-ethyl-1-hexene; and mixtures thereof.

Suitable nonconjugated dienes that can be used in the toughening component include, but are not limited to, straight chain dienes such as butadiene, 1,4-hexadiene; cyclic dienes such as cyclooctadiene; and bridged cyclic dienes such as ethylidene norbornene; and mixtures thereof.

This toughening agent is optionally but preferably present in an amount sufficient to impart toughening properties to the composition and contribute to the impact resistance of the blends. Sufficient amounts of the toughening component are from about 0.01 to 30 weight percent, preferably from about 5 to 25 weight percent, and more preferably from about 10 to 20 weight percent of the polyolefin composition. Moreover, when a copolymer including three different units is used, the amount of diene in the terpolymer in not critical and values as low as 0.5 weight percent of the toughening component are useful. Typically, the diene content of such copolymers will be from about 3 to 25 weight percent, and preferably from about 7 to 20 weight percent, of the toughening component.

Some such toughening agents are commercially available as Nordel® or Engages from DuPont Dow Elastomers LLC of Wilmington, Del., as Keltan® from DSM Elastomers Americas of Baton Rouge, La., as Vistalon® or Exact® from ExxonMobil Chemicals of Houston, Tex., as Dutral® from EniChem Elastomers Americas of Houston, Tex., as Buna® EP from Bayer Corporation of Pittsburgh, Pa., or as Royalene® from Uniroyal Chemicals of Middlebury, Conn.

The platable polyolefin blend optionally includes a propylene-containing polymer formed from one or more semi-crystalline homopolymers of propylene or copolymers of propylene with ethylene or an alpha-olefin. Suitable types of homopolymers of propylene include highly isotactic homopolymers of polypropylene. An acceptable copolymer of propylene is an ethylene-propylene copolymer. The ethylene-propylene copolymers can include, but are not limited to, sequentially polymerized blends of polypropylene with ethylene-alpha olefin copolymers. Ethylene-alpha olefin copolymers include alpha olefins having from 3 to 18 carbon atoms. Preferred alpha olefins include $C_3$ to $C_{10}$ alpha olefins, more preferably butene or octene, and in one embodiment, most preferably octene. It is preferred that the propylene polymer component, if present, makes up about 0.0001 to 20 weight percent of the overall composition.

Exemplary propylene-containing polymers are commercially available as Pro-fax® from Basell North America, Inc. of Wilmington, Del., as Fortilene®, HP/P 9000®, Acctuff® or Accpro® from British Petroleum Chemicals of Houston, Tex.

The polyolefin composition of the present invention may also optionally but preferably include a mineral filler. The higher levels of mineral filler according to the invention can increase stiffness and reduce shrinkage, especially in combination with the other components in the polyolefin composition of the present invention. The mineral filler preferably includes one or more treated or untreated inorganic materials. Preferred fillers include, but are not limited to, talc, calcium carbonate, wollastonite, alumina trihydrate, barium sulfate, calcium sulfate, carbon blacks, metal fibers, boron fibers, ceramic fibers, polymeric fibers, kaolin, glass, ceramic, carbon or polymeric microspheres, silica, mica, clay, glass or carbon fiber, or any combination thereof. Talc is the most preferred mineral filler. It is also preferred that the mineral filler be present in an amount from about 0.01 to 35 weight percent, more preferably about 5 to 20 weight percent and even more preferably about 8 to 15 weight percent of the polyolefin composition.

In addition to the above-described components, if necessary, additional components such as a colorant, a stabilizer, a plasticizer, a lubricant, and the like, or any combination thereof, can be added. Additional components can further include reinforcing agents, processing aids, and the like.

The polyolefin alloy of the present invention can be easily processed into molded articles by any suitable molding method, such as, but not limited to, injection molding or extrusion molding, and can provide products that have well-balanced properties including, but not limited to, platability, stiffness, and impact resistance. The ability of these parts to be suitably plated with metal further enhances the appearance and usefulness of these articles.

The present invention represents a significant advance in the art and the compositions herein can facilitate platability of various metals on the blends of the invention. Moreover, the use of ABS in a polyethylene matrix, particularly with a styrenic copolymer that is at least partially hydrogenated, enhances the interfacial interaction resulting in improved platability, as compared with currently used platable alloys. Although ABS is the most commonly used plastic for metal plating, the cost of plating grades of ABS is rather high, and the properties of plated ABS are not all that is desired, i.e., other structural properties are typically desired that ABS materials do not typically provide on their own. The use of polyethylene in addition to ABS, as a polymeric base to be metal plated, has certain advantages. Polyethylene is more chemically inert, has a lower water absorption, lower density, and is a low cost material relative to typical ABS resins. Thus, inclusion of both polyethylene and ABS can provide some of the benefits of each type of material.

The blends of the invention may be plated with metal using any of a wide variety of existing techniques. While polyethylene alone is difficult to plate using conventional electroplating processes, the addition of a sufficient amount of ABS resin in a polyethylene matrix allows for the platability of these materials due to the nature of the ABS resin materials. Any styrenic copolymers can be added to improve this blend. For example, by adding styrenic block copolymers, the interfacial interactions of different phases in polymer blends, which significantly influences the morphology, dispersion, and distribution of the polymer phase, can be significantly enhanced. Preferably, the polymeric component includes at least one styrene monoolefin copolymer. As a result, the polyolefin alloys prepared by this invention exhibit excellent plating performance and have well-balanced physical properties of stiffness and toughness.

As noted, the alloys of the present invention may be formed into the desired shape or configuration by any of a number of means well known to those of ordinary skill in the art, such as various types of conventional molding procedures, extrusion procedures, or the like, including forming into cast or oriented film, direct extrusion or other types of fiber forming, and the like.

After forming, the metal plating can likewise be accomplished by any number of procedures well known to those of ordinary skill in the art. For example, there are a wide variety of specific procedures for vacuum deposition of a thin surface coating of metal over a plastic, and an even wider variety of specific procedures for chemical deposition of such a coating. Also, following the vacuum or chemical deposition steps, the desired thickness of a metal coating and/or the coating of additional metals can be obtained by a number of well known electroplating, or other techniques. It should be understood that an initial conductive metal is deposited onto at least a portion of the surface of the article, and that additional metal layers of the same or different metals can be deposited on the initial conductive metal, on the polyolefin article, or both.

A number of commercial plastic plating techniques have been developed, and many of these are well known in the art. These include, for example, the so-called Enthone System and/or the MacDermid System. Typically, however, wide variations in plating bath additives and the concentrations of such additives, as well as other significant differences exist within any single given system. For example, most of these commercial plating systems were originally designed for plating ABS compositions, and a number of modifications, such as changes in the concentrations in the components of the acid etching baths, must be made where these systems are employed in the plating of ethylene. These modifications will be readily understood by those of ordinary skill in the art in view of the description of the invention herein.

Any platable metal can be used to plate the polyolefin alloy of the current invention, which metals include, but are not limited to, copper, semi-bright nickel, copper or nickel strike, nickel, bright nickel, chromium, and the like, and combinations thereof. The majority of compositions are plated with a copper/nickel/chromium electroplate. These finishes are seldom a single metal finish, and usually they include two or more successively provided layers of metal. In addition, one or more metal layers, each including one or more platable metals, may be electro-deposited upon a plastic. Preferably, the polymeric component including at least one styrene monoolefin copolymer and at least one styrene diolefin copolymer is included to help decrease the amount of metal required to suitably plate the polymeric blend of the invention. Typically, layers may have a thickness from about 0.1 to 80 micrometers, preferably from about 0.15 to 70 micrometers, and in one embodiment, even more preferably from about 0.2 to 60 micrometers. However, one of ordinary skill in the art will readily recognize that the choice of metal and the thickness of the layer depends on the materials in the blend of the invention and particularly on the desired application.

As compared with conventional platable compositions, the compositions of the present invention consistently exhibited superior adhesion under all types of forming, processing, and/or plating procedures tested. Moreover, the compositions of the invention provided improvements in both the kind and degree of adhesion.

Given the good balance of toughness and stiffness in the materials of the present invention, as well as other excellent properties noted previously, the polyolefin alloys of the invention are suitable for many specialized applications. For example, the polyolefin alloys can be shaped into components used in many interior and exterior automobile parts. As used herein, "shaping" could, for example, include molding and/or extruding, with the injection molding of a blend of the recited components being preferred. The resultant molded articles are highly useful for applications such as automobile door panels and bumpers.

Preferably, the polyolefin blends of the invention are both ductile at temperatures of about 0° C. and have suitable platability. In one preferred embodiment, the polyolefin blends have ductility at temperatures as low as about −15° C. and suitable platability.

EXAMPLES

The invention is further defined by reference to the following examples, describing the preparation of the polyolefin alloys of the present invention. It will be apparent to those of ordinary skill in the art that many modifications, both to materials and methods, may be practiced without departing from the purpose and interest of this invention. Thus, the following examples are offered by way of illustration, and not by way of limitation, to describe in greater detail the preparation, treatment, and testing of the novel polyolefin alloys.

The following measurement methods were used in the examples:

| | |
|---|---|
| MFR | Melt Flow Rate, measured in dg/min at 230° C., according to ASTM D-1238-99 |
| MAII | Multi-axial instrumented impact, provides load versus deformation response of plastics under multi-axial deformation conditions at impact velocities, reported as type of failure (brittle or ductile) at −15° C. and a velocity of 5 miles per hour, according to ASTM D-3763-99 |
| AMMS, % | After Molding Mold Shrinkage, measured as percentage of shrinkage after 40 hours of conditioning at 23° C., according to ASTM D-618-99 |
| Flex Modulus [kpsi] | Flexual Modulus, measured as 1000 pounds per square inch at 23° C., according to ASTM D-790-99 |
| Platibility | Electroplatable test results (Yes - platable; No - not platable; NT1 - expected to plate; NT2 - not expected to plate) |

The polyolefin-based composition of the present invention can be prepared, for example, in one step. About 20 to 80 weight percent of an ethylene component was combined with about 2 to 60 weight percent of an ABS resin component of an acrylonitrile-butadiene-styrene resin or a blend of styrene-acrylonitrile resin with a diene, about 1 to 45 weight percent of a polymeric compatibilizer that contains styrene in an amount sufficient to facilitate adhesion between the polymer components of the blend, optionally about 0.01 to 30 weight percent of a substantially amorphous copolymer or terpolymer of ethylene and an alpha olefin, and optionally a mineral filler along with the appropriate stabilizers, and then blended in a continuous twin-screw extruder or other batch type mixing equipment to afford the polyolefin composition.

The polyolefin composition is then surface treated, wherein such treatment typically includes cleaning, etching, neutralizing, catalyzing or accelerating the surface, or a combination thereof. Various other surface treatments can also be readily envisioned and implemented by those of ordinary skill in the art with reference to the description herein. Cleaning is a carefully programmed series of selective dip-treatment steps. Each step requires controlled treatment with the cleaning chemicals matched with the individual polyolefin composition. Etching creates a microporous surface on the composition. An etch system typically consists of chromic acid or a chromic acid/sulfuric acid etchant. The etchant chemically dissolves portions of the surface by oxidation, leaving a chemically modified and micro-roughened surface. Neutralizing is a method of reducing any chromic acid left in the pores of the composition surface from hexavalent $Cr^{+6}$ to trivalent $Cr^{+3}$, since $Cr^{+6}$ is detrimental to later steps. A catalyst promoter may be used in conjugation with the neutralizer. These promoters create a polar charge on the composition. A catalyst bath is normally a palladium chloride/stannous chloride solution that is absorbed into the micro-pores created in the etch step. The palladium will act as active catalyst sites for chemical reduction of the electroless copper or electroless nickel. An accelerator bath removes loosely adherent palladium and excess tin and provides a surface on which the copper or nickel can plate quickly and easily.

Electroless plating typically forms the initial conductive metal layer upon which the metal is electroplated. This metal layer normally is pure copper or nickel/phosphorus alloy, depending on the corrosion requirements of the plated part. Both electroless copper and electroless nickel baths contain combinations of metal salts, chelaters, stabilizers, and reducers. The metal from metal salts chemically reduces onto the active palladium sites from the catalyzing step. After palladium sites are covered, the reaction generally becomes autocatalytic and the deposit continues to build on itself at a controlled rate. These metals are usually allowed to deposit to about 0.5 to 1.0 μm. Parts are then ready for electroplating. This is also referred to as chemical deposition.

The electroplating process electrolytically builds the initial electroless metal layer to a thick, durable finish. The thick metal layer here allows standard electroplating processes to be used. The majority of compositions are plated with a copper/nickel/chrome electroplate. These finishes are seldom a single metal finish, usually they are two or more successive layers. For example, an exterior automotive part typically requires a layer of bright acid copper, a layer of semi-bright nickel, a layer of bright nickel, a layer of particle nickel, and a layer of chrome.

The electroplated film of metal is typically produced by placing the plastic having a thin film of chemically deposited metal thereon in a solution containing ions of the metal that is desired for electroplating, e.g., copper, nickel, or chrome. An electrical current is then passed through the solution, and the thin film of metal results in the deposition of the new metal and forms a film having the desired thickness.

EXAMPLES 1–4

Platable Polyolefin Alloys of the Invention

Various polyolefin blends were prepared and were tested for the suitability of chrome application. Examples 1–4 were prepared according to the invention, and included a polyethylene, ABS, and a polymeric compatibilizer, as well as elastomer and filler. Controls 1–4 are comparative examples that did not include HDPE, a hydrogenated styrenic compatibilizer, and ABS. These same blends were also subjected to a brittle/ductile impact test according to ASTM D-3763.

The components and results of each Example are set forth in Table I below:

TABLE I

|  | Ex. 1 | Ex. 2 | Ex. 3 | Ex. 4 | Cont. 1 | Cont. 2 | Cont. 3 | Cont. 4 |
| --- | --- | --- | --- | --- | --- | --- | --- | --- |
| HDPE | 37 | 32 | 37 | 40 | — | 37 | 37 | 45 |
| ABS | 23 | 23 | 23 | 5 | 45 | 23 | 23 | — |
| HSC | 5 | 10 | 10 | 5 | 5 | — | — | 5 |
| Elastomer | 15 | 15 | 20 | 10 | 10 | 15 | 20 | 10 |
| Rubber | 10 | 10 | — | 20 | 20 | 15 | 10 | 20 |
| Filler | 10 | 10 | 10 | 20 | 20 | 10 | 10 | 20 |
| MFR [dg/min] | 5.3 | 5 | 4.9 | 5.8 | 2.2 | 5.5 | 4.7 | 6.4 |
| AMMS [%] | 1.39 | 1.31 | 1.27 | 1.50 | 0.24 | 1.35 | 1.41 | 1.67 |
| Flex modulus [kpsi] | 166 | 149 | 134 | 160 | 327 | 190 | 173 | 126 |
| MAII at −15° C. | Ductile | Ductile | Ductile | Ductile | Brittle | Brittle | Brittle | Ductile |
| Platability | Yes | Yes | Yes | Yes | NT1 | NT1 | NT1 | NT2 |

HDPE: High density polyethylene
ABS: Acrylonitrile-butadiene-styrene resin
HSC: An hydrogenated styrenic copolymer, such as SEBS, SBBS; Styrene content: 30–70%
Elastomer: Copolymer of ethylene and alpha-olefins Ethylene content 75%; Molecular weight (MW): 140,000; Polydispersity: 1.97
Rubber: A diene rubber, such as styrene-butadiene
Filler: Talc Although Exs. 1–4 had varying amounts of polyethylene, ABS, and compatibilizer, all four examples show the desired properties of the current invention—both ductility and platability. Control 1 indicated that the use of ABS as the main polymeric matrix resulted in an unacceptable brittle failure. Control 2–3 showed that, even with the presence of HDPE, the lack of hydrogenated material resulted in an unsuitable brittle failure. As a result, platability of these samples were not tested. Control 4 showed that the presence of ABS was beneficial to the platability of the blend.

The term "about," as used herein, should generally be understood to refer to both numbers in a range of numerals. Moreover, all numerical ranges herein should be understood to include each whole integer within the range.

Although preferred embodiments of the invention have been described in the foregoing description, it will be understood that the invention is not limited to the specific embodiments disclosed herein but is capable of numerous modifications by one of ordinary skill in the art. It will be understood that the materials used and the chemical details may be slightly different or modified from the descriptions herein without departing from the methods and compositions disclosed and taught by the present invention.

What is claimed is:

1. A platable polyolefin blend comprising:
   an ethylene polymer that is free of propylene and that comprises polyethylene, high density polyethylene, low density polyethylene, linear low density polyethylene, or a combination thereof;
   a polymeric compatibilizer comprising styrene-ethylene/butylene-styrene (SEBS), styrene-ethylene/butylene, styrene-butylene-butadiene-styrene (SBBS), or a combination thereof that is present in an amount sufficient to facilitate adhesion between the components of the polyolefin blend; and
   an ABS resin component of an acrylonitrile-butadiene-styrene resin or a blend of styrene-acrylonitrile resin with a diene, the ABS resin component being present in an amount sufficient to render the polyolefin blend suitable for electroplating.

2. The platable polyolefin blend of claim 1, wherein the ethylene polymer is present in an amount of about 20 to 80 weight percent of the composition and the ABS resin component is present in an amount of about 2 to 60 weight percent of the composition.

3. The platable polyolefin blend of claim 1, wherein the sufficient amount of the polymeric compatibilizer is about 2 to 40 weight percent of the polyolefin blend.

4. The platable polyolefin blend of claim 1, wherein the ethylene polymer comprises an ethylene-containing homopolymer or ethylene-containing copolymer, or a combination thereof.

5. The platable polyolefin blend of claim 1, wherein the sufficient amount of polymeric compatibilizer is about 1 to 45 weight percent of the polyolefin blend.

6. The platable polyolefin blend of claim 1, wherein the polymeric compatibilizer further optionally includes a styrene diolefin copolymer comprising block or random copolymers of styrene and an unsaturated olefinic component.

7. The platable polyolefin blend of claim 6, wherein the styrene diolefin copolymer comprises styrene-butadiene (SB), styrene-butadiene-styrene, styrene-isoprene, styrene-isoprene-styrene, or combinations thereof.

8. The platable polyolefin blend of claim 6, wherein the styrene diolefin copolymer is present and comprises an amount of up to about 35 weigh percent of the polyolefin blend.

9. The platable polyolefin blend of claim 1, further comprising a toughening agent of a substantially amorphous copolymer or terpolymer of ethylene and an alpha olefin present in an amount of about 0.01 to 30 weight percent.

10. The platable polyolefin blend of claim 1, which further optionally comprises at least one inorganic filler present in an amount of up to about 35 percent by weight of the polyolefin blend.

11. The platable polyolefin blend of claim 1, which further optionally comprises a propylene-containing polymer formed from a semi-crystalline homopolymer of propylene or a copolymer of propylene with ethylene or an alpha-olefin present in an amount of up to about 20 percent by weight of the polyolefin blend.

12. The platable polyolefin blend of claim 1, wherein the blend is ductile at 0° C.

13. A molded article of manufacture comprising the polyolefin blend of claim 1.

14. The molded article of claim 13 further comprising a metal deposit disposed over a portion of the molded article.

15. A platable polyolefin blend comprising:
   an ethylene polymer that is free of propylene and is present in an amount of about 20 to 80 weight percent and that comprises polyethylene, high density polyethylene, low density polyethylene, linear low density polyethylene, or a combination thereof;
   a polymeric compatibilizer comprising styrene-ethylene/butylene-styrene (SEBS), styrene-ethylene/butylene, styrene-butylene-butadiene-styrene (SBBS), or a combination thereof that is present in an amount of about 1 to 45 weight percent to facilitate adhesion between the components of the polyolefin blend;
   an ABS resin component of an acrylonitrile-butadiene-styrene resin or blend of styrene-acrylonitrile resin with a diene, the ABS resin component being present in an amount of about 2 to 60 weight percent to render the polyolefin blend suitable for electroplating; and
   optionally, a toughening agent of a substantially amorphous copolymer or terpolymer of ethylene and an alpha olefin present in an amount of about 0.01 to 30 weight percent.

16. A process for preparing a plated polyolefin article which comprises:
   blending an ethylene polymer that is free of propylene; a polymeric compatibilizer comprising at least one styrene monoolefin present in an amount sufficient to facilitate adhesion between the components of the polyolefin blend and an ABS resin component of an acrylonitrile-butadiene-styrene resin or a blend of styrene-acrylonitrile resin with a diene, the ABS resin component being present in an amount sufficient to render the polyolefin blend suitable for electroplating, to form a blend;
   forming the blend into an article having a desired form, shape, and an exterior surface;
   depositing an initial conductive metal onto at least a portion of the surface of the article; and
   plating a second metal over the polyolefin article.

17. The process of claim 16, wherein the forming comprises molding the blend.

18. The process of claim 16, wherein the second metal is deposited by electroplating or by vacuum deposition.

19. The process of claim 16, wherein the initial conductive metal is copper, a nickel/phosphorus alloy, or a mixture thereof.

20. The process of claim 16, wherein the second metal comprises nickel, copper, chromium, or a mixture thereof and the second metal is deposited over the initial conductive metal.

21. A molded polyolefin article produced by the process of claim 16.

22. The molded polyolefin article of claim 21 in the form of an automotive component.

* * * * *

UNITED STATES PATENT AND TRADEMARK OFFICE
CERTIFICATE OF CORRECTION

PATENT NO. : 6,824,889 B2  
DATED : November 30, 2004  
INVENTOR(S) : Matteucci et al.

It is certified that error appears in the above-identified patent and that said Letters Patent is hereby corrected as shown below:

Column 13,  
Line 48, after "amount of up to about 35", delete "weigh" and insert -- weight --.

Column 14,  
Line 20, after "styrene resin or", insert -- a --.  
Line 35, after "polyolefin blend", insert -- ; --.

Signed and Sealed this

Seventeenth Day of May, 2005

JON W. DUDAS  
*Director of the United States Patent and Trademark Office*